US012528900B2

(12) United States Patent
Gonzalez Herrera et al.

(10) Patent No.: US 12,528,900 B2
(45) Date of Patent: Jan. 20, 2026

(54) SINGLE-USE FILTER COMPONENT, A METHOD FOR TREATING AIR AND USE OF A POLYMER OR COPOLYMER OF DIVINYLBENZENE

(71) Applicant: Johnson Matthey Public Limited Company, London (GB)

(72) Inventors: Monica Gonzalez Herrera, Reading (GB); Andrew Scullard, Reading (GB)

(73) Assignee: Johnson Matthey Public Limited Company, London (GB)

( * ) Notice: Subject to any disclaimer, the term of this patent is extended or adjusted under 35 U.S.C. 154(b) by 918 days.

(21) Appl. No.: 17/659,926

(22) Filed: Apr. 20, 2022

(65) Prior Publication Data
US 2022/0372192 A1 Nov. 24, 2022

(30) Foreign Application Priority Data
May 18, 2021 (EP) .................... 21174287

(51) Int. Cl.
| C08F 236/20 | (2006.01) |
| B01D 35/143 | (2006.01) |
| B01D 46/00 | (2022.01) |
| B01D 53/56 | (2006.01) |
| B01J 20/26 | (2006.01) |
| C08F 212/34 | (2006.01) |
| C08K 3/04 | (2006.01) |

(52) U.S. Cl.
CPC .......... C08F 236/20 (2013.01); B01D 35/143 (2013.01); B01D 46/0015 (2013.01); B01D 46/0086 (2013.01); B01D 53/565 (2013.01); B01J 20/267 (2013.01); C08F 212/34 (2013.01); C08K 3/04 (2013.01); B01D 2253/202 (2013.01)

(58) Field of Classification Search
CPC ..... C08F 236/20; C08K 3/04; B01D 46/0015; B01D 53/565; B01D 35/143; B01D 46/0086; B01D 2253/202; B01J 20/267
USPC ........................................................ 524/155
See application file for complete search history.

(56) References Cited

U.S. PATENT DOCUMENTS

| 5,792,437 A | 8/1998 | Schleicher et al. |
| 6,576,044 B1 | 6/2003 | Ho |
| 8,076,384 B2 | 12/2011 | Xu et al. |
| 11,000,827 B2 | 5/2021 | Maanum et al. |
| 2018/0311599 A1 | 11/2018 | Zhong |

FOREIGN PATENT DOCUMENTS

| DE | 40 27 799 A1 | 3/1992 | |
| DE | 41 34 222 A1 | 4/1993 | |
| EP | 1018367 B1 | 10/2003 | |
| EP | 2138230 B1 | 1/2015 | |
| JP | S51-103090 A | 9/1976 | |
| JP | H9-504470 A | 5/1997 | |
| JP | H10-43540 A | 2/1998 | |
| JP | 2009-62512 A | 3/2009 | |
| JP | 2010-7069 A | 1/2010 | |
| JP | 2015174006 A | * 10/2015 | |
| JP | 2019-513539 A | 5/2019 | |
| WO | 2017/160634 A1 | 9/2017 | |
| WO | WO-2017160646 A2 | * 9/2017 | ............. A62B 23/02 |
| WO | 2020086525 A1 | 4/2020 | |

OTHER PUBLICATIONS

Grubner et al., "Collection of Nitrogen Dioxide by Porous Polymer Beads," American Industrial Hygiene Association Journal, 33:4, 201-206 (1972).
Jellinek and Flagsman, Journal of Polymer Science, Part A-1, vol. 7, 1153-1168 (1969).
Pastorelli et al., "Environmentally induced colour change during natural degradation of selected polymers," Polymer Degradation and Stability 107, 198-209 (2014).

* cited by examiner

Primary Examiner — Marc S Zimmer
Assistant Examiner — Ronald Grinsted
(74) Attorney, Agent, or Firm — BakerHostetler

(57) ABSTRACT

The present disclosure relates to a single-use filter component for removing $NO_2$ in an air-treatment system, the component comprising a polymeric composition as an air-filtration medium, the polymeric composition comprising a plurality of free vinyl groups, wherein the component permits inspection of the air-filtration medium by an end-user to determine when the filter is spent, based on a white to yellow colour change, or comprises an optical sensor configured to notify the end-user of the colour change. The present disclosure further relates to a single-use filter component for simultaneously removing $NO_2$ in an air-treatment system, wherein the component comprises a HEPA filter formed from a polymeric composition comprising a plurality of free vinyl groups. The present disclosure further relates to an air treatment system, to a method of treating air and to the use of a polymer or copolymer of divinylbenzene for forming an air-filtration medium.

11 Claims, 2 Drawing Sheets

SINGLE-USE FILTER COMPONENT, A METHOD FOR TREATING AIR AND USE OF A POLYMER OR COPOLYMER OF DIVINYLBENZENE

The present invention provides a single-use filter component. More particularly, the present invention provides a single-use filter component for removing $NO_2$ in an air-treatment system. The present invention also provides an air-treatment system comprising said single-use filter component. Specifically, the single-use filter component comprises a polymeric composition as an air-filtration medium wherein the polymeric composition comprises a plurality of free vinyl groups. Furthermore, the present invention provides a method of treating air, the method comprising passing $NO_2$-containing air through said single-use filter. The present invention also provides a use of a polymer or copolymer of divinylbenzene for forming an air-filtration medium, more specifically, wherein at least 7.0% of the carbon atoms of the polymer or copolymer of divinylbenzene are vinyl carbon atoms. The present invention is particularly applicable for air-conditioning systems, including both domestic air-purifiers and industrial HVAC systems, as well as products such as masks.

It is well known that air-pollution is an ever growing concern in modern society and has devastatingly negative impacts on the environment and ultimately the health of humans. Data from the World Health Organisation (WHO) shows that nine out of ten people breathe air that exceeds WHO guideline limits containing high levels of pollutants with ambient air pollution estimated to cause over four million premature deaths worldwide every year. Pollution is a particular concern in populated urban environments wherein pollution from industrial processes (such as power generation, agriculture and waste incineration), along with the significant amount of pollution emitted from motor vehicles during fuel combustion, can produce hot spots of very high levels of environmental pollutants harmful to health. However, household air pollution is another concern, particularly in the developing world. Household air pollution can arise during domestic activities such as cooking or the burning of fuels such as wood and coal.

Air pollutants include both gaseous and particulate (yet suspended in air) pollutants. Particulate matter (PM) is typically made up of very small solid or liquid particles, frequently solid carbon particles having a diameter of less than 10 microns ($PM_{10}$), fine and ultra-fine particles with a diameters of less than 2.5 microns ($PM_{2.5}$) and less than 0.1 microns ($PM_{0.1}$), respectively. Common sources include combustion engines and the burning of fuels such as wood and coal. Gaseous pollutants which, along with the particulate pollutants, are known to have negative health impacts, include nitrogen dioxide ($NO_2$), nitrogen monoxide (NO), ozone ($O_3$), sulfur dioxide ($SO_2$) and carbon monoxide (CO).

Despite the long held knowledge of the problems with gaseous pollutants, the majority of filters used for air-purification focus on trapping particulate matter. Typically, a filter is made from different layers of porous media, possibly with differing thicknesses depending on the final application and the minimum size of particulate matter to be filtered. The layers are often made from glass fibers or polymers.

Along with particulate matter, $NO_2$ is notable pollutant arising from road emissions, i.e. from the burning of fuels in combustion engines. Road traffic is the principal outdoor source of nitrogen dioxide. Therefore, those living near busy roads are particularly exposed to and affected by $NO_2$ pollution. Additionally, $NO_2$ may also arise from internal sources such as cooking and heating. Long term exposure to $NO_2$ may cause a decrease in lung function. Even with short term exposure, there is evidence that $NO_2$ can increase the risk of bronchitis and asthma. $NO_2$ can cause inflammation of the airways and increase susceptibility to respiratory infections and allergens.

However, there is a need to control the levels of ambient $NO_2$ such that there remains a need for effective air-filters capable of filtering harmful gaseous pollutants like $NO_2$.

It is known that filters may further comprise an adsorbent or a catalyst to remove gaseous pollutants such as volatile organic compounds, carbon monoxide and nitrogen dioxide. A common adsorbent/catalyst is activated carbon and in recent decades there has been much study regarding the factors influencing $NO_2$ adsorption on activated carbon. However, over time the amount of nitrogen dioxide slip can readily increase. Furthermore, activated carbon can reduce nitrogen dioxide to afford nitrogen monoxide (nitric oxide) which is another pollutant. Activated carbon does not strongly bind either $NO_2$ or NO which are therefore not sufficiently absorbed to remove the pollutant from the air. Naturally, it is preferred that nitrogen dioxide be filtered from the air without the production of other nitrogen oxides, principally nitric oxide. Since air pollutants are generally not visible to the naked eye, at least at background levels, and given that activated carbon remains substantially black, it is not possible for an end user to visually determine when the adsorbent is underperforming or spent. Some commercial air-purifiers are provided with sensors which alert a user to increased pollutant concentration in the ambient air. Numerous other materials such as zeolites, metal organic frameworks (MOFs) and metal oxides such as $Al_2O_3$ and $TiO_2$ (doped and undoped) have been investigated for their adsorptive capacity but none have the required efficiency for use in an air filter to remove $NO_2$. Nevertheless, some air-purifiers include some further materials such as zeolite or alumina along with activated carbon.

It has been known for many decades that polymers can react with gaseous pollutants such as $NO_2$. For example, *Journal of Polymer Science*, Part A-1, Vol 7, 1153-1168 (1969) by Jellinek and Flagsman studies the reaction of nitrogen dioxide with polystyrene films. Shortly after, Grubner et al. studied the reactivity of nitrogen dioxide with Porapak® Q in *American Industrial Hygiene Association Journal*, 33:4, 201-206 "Collection of Nitrogen Dioxide by Porous Polymer Beads". Porapak® Q is a cross-linked polymer of ethylvinylbenzene and divinylbenzene primarily used in HPLC columns WO 2017/160646 A1 discloses air filters comprising polymeric sorbents for reactive gases. The reactive gases are disclosed as being hydrogen fluoride, fluorine, hydrogen bromide, bromine, hydrogen chloride, chlorine, sulfuric acid, sulphurous acid, hydrogen sulfide, sulfur dioxide, nitric acid, nitrous acid, nitrogen dioxide or mixtures thereof. The polymeric sorbent comprises the reaction product of (i) a precursor polymeric material comprising a polymerized product of a polymerizable composition comprising 8 to 65 wt % maleic anhydride, 30 to 85 wt %, divinylbenzene and 0 to 40 wt % of a styrene-type monomer and (ii) a nitrogen containing compound selected from ammonia or a compound having at least one primary or secondary amino group. This disclosure focusses on the removal of sulfur dioxide ($SO_2$), the removal of the reactive gas resulting from the reaction with the amino groups present in the polymeric sorbent.

Consequently, there is a need in the art for components for use in air-treatment systems which are effective at removing $NO_2$ from the air and which enable the end-user to easily determine when the sorbent material is spent and needs to be replaced. The inventors developed the present invention with the aim to overcome the problems in the prior art.

Accordingly, in a first aspect, there is provided a single-use filter component for removing $NO_2$ in an air-treatment system, the component comprising a polymeric composition as an air-filtration medium, the polymeric composition comprising a plurality of free vinyl groups, wherein the component permits inspection of the air-filtration medium by an end-user to determine when the filter is spent, based on a white to yellow colour change, or comprises an optical sensor configured to notify the end-user of the colour change.

The present disclosure will now be described further. In the following passages, different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

The present invention relates to a single-use filter component for removing $NO_2$ in an air-treatment system. By "single-use" it is meant that the filter component is intended to be used without regeneration of the filter and which may be replaced with a replacement component once the filter component has reached the end of its working lifetime. This may be determined as described herein. Furthermore, "single-use" should not be construed as limited to use on a single occasion but rather a single lifetime. Accordingly, a "single-use" filter may be still have capacity to adsorb $NO_2$ after having been put into use by an end-user. For example, an air-conditioning system or an air-purifier may be turned on and off to actively pass air through a "single-use" filter component on multiple occasions.

The component is a part of the air-treatment system. Preferably, the component is a replaceable part of the air-treatment system. In other words, the component of the present invention may be removed by an end-user once the filter component is spent and replaced with a fresh filter component, for example, in an air-purifier. In another example, a mask such as a respirator may comprise a removable filter component. Alternatively, the component may be integral to the air-treatment system. Typically, this is preferred where the air-treatment system is disposable in view of the cost to dispose of the entire system. For example, the air-treatment system may be a disposable mask comprising an integrally formed single-use filter component.

The filter component as described herein is suitable for removing $NO_2$ when installed in an air-treatment system. The air-treatment system denotes any type of apparatus or device wherein the filter component may be presented to an air stream to be treated for the removal of $NO_2$.

The filter component comprises a polymeric composition as an air-filtration medium. Specifically, the polymeric composition comprises a plurality of free vinyl groups. The present inventors have found that a filter component comprising an air-filtration medium formed from a polymeric composition comprising a plurality of free vinyl groups, the filter demonstrated an advantageous selectivity for the adsorption of $NO_2$ from the air. Specifically, the inventors believe that the $NO_2$ reacts with the free vinyl groups and may therefore be considered chemisorbed. By a "free vinyl group" it is meant that the polymeric composition comprises R—CH=$CH_2$ groups. A polymeric composition can be obtained by reacting monomers comprising ethylenic groups (i.e. those containing a carbon-carbon double bond) such as vinyl groups, in an addition polymerisation reaction to form a singly bonded carbon chain backbone. Accordingly, free vinyl groups are those which have not reacted. As described herein, the inventors have found that divinylbenzene is a particularly preferable monomer which can be polymerised so as to yield a polymer wherein a portion of the vinyl groups do not react to polymerise or crosslink.

The component of the present invention permits inspection of the air-filtration medium by an end-user to determine when the filter is spent. The end-user is able to determine when the filter is spent based on a white to yellow colour change. Alternatively, the component comprises an optical sensor configured to notify the end-user of the colour change and hence the need to replace the filter. An optical sensor can be configured, for example, to provide an output once a certain wavelength of reflected light is observed (i.e. a sufficiently yellow light to suggest depletion of the $NO_2$ removal performance).

The filter component may therefore take any form known in the art provided that the component is provided with a means to allow the end-user to become aware of the color change. In one embodiment, the component may comprise a frame, such as a perimeter frame, or a housing. The component may preferably take the form of a cartridge made from injection molded rigid plastic. Such a cartridge may be designed to fit into the air-filtration system such as an air-conditioner. In any event, the component contains the air-filtration medium and may comprise a resalable opening which permits the user to directly view the air-filtration medium. Preferably, an opening in the component may be a screen or mesh which comprise apertures sufficient to contain the air-filtration medium but which permits visual inspection. In another embodiment, the component may comprise an optically transparent portion to permit inspection of the air-filtration medium held within the component, for example a transparent window. In such embodiments, rather than the end-user actively inspecting the colour change, an external optical sensor may be used to detect such a colour change and notify an end-user. Such an external optical sensor may form part of the air-treatment system within which the filter component is installed rather than the filter component per se.

The present inventors have found that by providing a polymeric composition as an air-filtration medium having a plurality of free vinyl groups, nitrogen dioxide can react with the vinyl groups giving rise to a yellow coloured product. Consequently, the inventors have found that by increasing the number of vinyl groups in the polymer, the colour change is more prominent and simultaneously, the quantity of $NO_2$ which can be adsorbed is greatly improved. Thus the present invention does not require and preferably, the polymeric composition does not comprise a separate colorimetric indicator such as a pH indicator, e.g. methyl red. In other words, the color change from white to yellow arises entirely from the chemisorption of $NO_2$ to the polymeric composition as a result of the reaction between the plurality of free vinyl groups with $NO_2$.

In an alternatively preferred embodiment, the component comprises an optical sensor which is capable of detecting the colour change from white to yellow and notifies the user once a sufficient colour threshold has been reached. This is particularly preferable for air-conditioning and air-purifying systems which may be installed in locations more difficult to reach for a user, for example, in industrial HVAC systems.

Where the component permits visual inspection by a user, the component preferably comprises a yellow marker for permitting the end-user to make a comparison with the air-filtration media and thereby determine when the filter is spent. Accordingly, the filter component of the present invention allows an end-user to replace the filter comprising the air-filtration medium with a fresh filter component once the color of the air-filtration medium and the marker match, and/or otherwise dispose of the spent filter such as when the filter is part of a disposable mask.

As will be appreciated, the precise point at which the colour change denotes that the filter has a depleted $NO_2$ removal performance will depend on the filtration medium selected. Where a polymer has more free vinyl groups per unit weight, the intensity of the final colour may be a darker yellow than for a polymer with fewer free vinyl groups. Accordingly, the skilled person can readily select the desired end point based on the polymer selected, based on routine testing. For example, a polymer can be tested to observe when $NO_2$ levels in a treated test gas begin to rise, and the colour of the polymer can then be set to provide the end-point or replacement-point.

In one embodiment, the component further comprises activated carbon downstream of the polymeric composition. Activated carbon is a preferable additional material of the filter component, particularly with air-conditioning systems since activated carbon may be used to adsorb other pollutants such a volatile organic compounds, aromas, gaseous household chemicals and many other gases. The inventors have found that by providing activated carbon downstream of the polymeric composition, $NO_2$ may be selectively adsorbed prior to contact with the activated carbon which could otherwise be reduced to form NO. As will be appreciated, downstream refers to the location of the activated carbon relative to the direction in which the air to be treated moves through the filter when in use.

Downstream is used to refer to a position in which air to be treated arrives at after such that the air to be treated is first passed through the polymeric composition and then the activated carbon. This configuration minimises or prevents NO production on the activated carbon and frees up the capacity of the activated carbon to treat other pollutants than $NO_2$.

Preferably the air-filtration medium is provided in the form of a plurality of beads held within the component. Beads are substantially spherical and may be described by a mean particle size ($d_{50}$) preferably in the range 100 µm to 1600 µm, preferably 300 µm to 1200 µm. These beads may, for example, be held between mesh screens.

Preferably, the air-filtration medium has a surface area of at least 600 $m^2/g$. Such a high surface area permits efficient extraction of $NO_2$ from the air which is typically a pollutant present in relatively low concentrations (such as less than 1 ppm in ambient air). Surface area may also be referred to a BET specific surface area as the total surface area of the porous polymer per unit of mass (or volume), such measurements customary in the art and typically measured by nitrogen adsorption. Preferably, the surface area is at least 700 $m^2/g$, more preferably 750 to 2000 $m^2/g$.

In one embodiment, the polymeric composition may be supported on fibers. For example, the polymeric composition may be supported on a scrim which is a woven fabric typically made from cotton. The polymeric composition may also be supported on wool which is a material which may also simultaneously adsorb the pollutant formaldehyde.

In another embodiment, the polymeric composition itself may be provided in the form of a woven or non-woven fabric, the fibers being formed of the polymeric composition. Preferably, the polymeric composition is meltblown to form a non-woven sheet as an air-filtration medium. Even more preferably, the polymeric composition may be provided in the form of a HEPA filter. HEPA filters are well known in the art and are required to be capable of filtering at least 99.95% of particles whose diameter is equal to or greater than 0.3 µm, preferably greater than 99.97%. Therefore, the HEPA filter may simultaneously physical capture and filter particles greater than 0.3 µm which include microorganisms such as bacteria and viruses, dust and aerosols along with adsorbing gaseous $NO_2$ from the air. In order to prevent increasing back pressures, it is necessary for HEPA filters to be replaced over time. The simultaneous color change resulting from reaction with $NO_2$ serves to indicate to the user when the filter is spent and needs to be replaced.

Since existing filters may already comprise a HEPA filter upstream of an activated carbon filter, providing the $NO_2$-treating polymer itself as a HEPA filter is highly desirable. This is because there is no additional component to increase the back-pressure. This is particularly important in air-conditioning systems where back-pressure limitations are key.

A further aspect of the present invention provides a single-use filter component for simultaneously removing $NO_2$ in an air-treatment system, wherein the component comprises a HEPA filter formed from a polymeric composition comprising a plurality of free vinyl groups. HEPA filters are well-known and are typically replaced periodically without inspection, often based on an expected lifetime of the filter in a given application. Accordingly, the filter of the further aspect serves to simultaneously remove $NO_2$ from the air which is filtered. Given that HEPA filters are often replaced on a regular basis to ensure continued effective particulate filtration, there is no need for a user to inspect the colour change resulting from $NO_2$ adsorption.

The polymeric composition comprises a plurality of free vinyl groups. As described herein, the inventors have found that the presence of free and unreacted vinyl groups may be used to react with $NO_2$ to efficiently remove $NO_2$ from the air whilst simultaneously causing the polymeric composition to change in colour from white to yellow. The presence of free vinyl groups in the polymeric composition may be easily determined by $^{13}C$ solid state nuclear magnetic resonance ($^{13}C$ SSNMR) spectroscopy, as described herein.

It is particularly preferred that the polymeric composition is a hydrocarbon, i.e. consists of hydrogen and carbon. In other words, the polymeric composition is preferably the product of the polymerisation of hydrocarbon precursors. Hydrocarbon polymers without additional functional groups makes the polymer relatively inert to many pollutants, and are also hydrophobic, which make them particularly suitable for the selective adsorption of $NO_2$. In order to incorporate free vinyl groups into the final polymer, preferably at least one precursor comprises two vinyl groups such that one vinyl group is incorporated into the polymer backbone during polymerisation and the other remains unpolymerised and therefore free. Accordingly, divinylbenzene is a particularly preferable precursor, i.e. a particularly preferable monomer for polymerisation. Thus, the polymeric composition preferably comprises a polymer or copolymer of divinylbenzene. Even more preferably, the polymeric composition consists of a polymer or copolymer of divinylbenzene. Divinylbenzene refers generally to a mixture of para and meta isomers of divinylbenzene since such a mixture of isomers is the most commonly commercially available form.

Polymers and copolymers of divinylbenzene (DVB) are known and are frequently used in chromatography as porous polymer adsorbents. Polymers and copolymers of divinylbenzene can range from mesoporous to microporous having particularly high surface areas which allows for efficient interaction of the air with the polymer. Whilst polymers and copolymers of DVB are known, DVB having two vinyl groups is employed during polymerisation as a crosslinking agent to link two polymer chains during polymer growth rather than to provide free vinyl groups. Accordingly, the resulting polymers may have no free vinyl groups. A common copolymer is that resulting from the polymerisation of styrene with divinylbenzene (i.e. styrene-divinylbenzene).

The inventors have found that it is possible to increase the number of free vinyl groups in a resulting polymer or copolymer by polymerising monomers that comprise at least two vinyl groups and/or increasing the concentration of such monomers in a polymerisable composition before polymerisation.

Accordingly, the polymeric composition is preferably the product of polymerisation of a polymerisable composition comprising at least 60 wt % of a monomer comprising at least two vinyl groups. Even more preferably, the polymerisable composition comprises at least 70 wt %, at least 80 wt %, at least 85 wt %, at least 90 wt % of a monomer comprising at least two vinyl groups. Accordingly, when the polymeric composition comprises or consists of a polymer or copolymer of divinylbenzene, the polymeric composition is the product of polymerisation of a polymerisable composition comprising at least 60 wt %, at least 70 wt %, at least 80 wt %, at least 85 wt %, at least 90 wt % divinylbenzene. Preferably the polymeric composition comprises a polymer of divinylbenzene, i.e. the product of polymerisation of essentially divinylbenzene. However, divinylbenzene having a purity close to 100% is difficult to obtain and can be relatively expensive. For this reason, at least 80 wt % divinylbenzene is particularly preferred for forming a copolymer of divinylbenzene. In another embodiment, monomers having at least three vinyl groups may be used for polymerisation such as trivinylbenzene. However, divinylbenzene is generally readily commercially available and also a relatively cheap monomer for polymerisation which therefore reduces the cost of the single-use filter component.

Preferably, the polymeric composition comprises a copolymer of divinylbenzene and an optionally substituted styrene, typically styrene and/or an alkyl substituted styrene, preferably styrene and/or ethylstyrene (i.e. ethylvinylbenzene). As with divinylbenzene, alkylstyrene and ethylstyrene generally each refer to mixtures of para and meta alkylstyrene and para and meta ethylstyrene. Accordingly, the polymeric composition is preferably the product of polymerisation of a polymerisable composition consisting essentially of divinylbenzene and optionally substituted styrenes, preferably styrene and/or ethylstyrene. Such a composition is commercially available as "divinylbenzene" since the divinylbenzene precursor is frequently only available in relatively low purity, such as at least 50 wt %. Divinylbenzene is often produced commercially by the thermal dehydrogenation of isomeric diethylbenzenes. In accordance with the desire to increase the number of free vinyl groups, commercially available divinylbenzene having a purity of at least 80 wt % is particularly suitable since the remaining 20 wt % is typically a mixture of styrene and ethylstyrene together with unavoidable impurities. In commercially available divinylbenzene, some unavoidable impurities such a naphthalene may remain from the cyclisation of ortho divinylbenzene though substantially all of the naphthalene may be easily separated.

In another embodiment, the polymeric composition may comprise a copolymer of a methacrylate (such as methyl methacrylate) and divinylbenzene and optionally styrene and/or alkylstyrene as discussed above. Such a polymeric composition may be obtained from the polymerisation of commercially available divinylbenzene with a methacrylate.

Suitable divinylbenzene copolymers for use as air-filtration mediums in accordance with the present invention include Lewatit® VP OC 1065 available from Lanxess® (a copolymer of an amine functionalised styrene with DVB) and Diaion® HP20 available from Mitsubishi Chemical Corporation which is a copolymer of DVB and styrene. Porapak® Q is a copolymer of ethylvinylbenzene and divinylbenzene. In a particularly preferred embodiment, the polymeric composition is PuroSorb® PAD1200 available from Purolite® which is a copolymer obtainable from the polymerisation of commercially available divinylbenzene and its associated impurities such as ethylstyrene. PAD1200 provides a particularly high amount of free vinyl groups due to the incomplete polymerisation of the large amount of divinylbenzene in the polymerisable composition used.

The polymeric composition for use in the present invention provides a plurality of free vinyl groups for reaction with $NO_2$ from a stream of air containing $NO_2$. The number of free vinyl groups may be quantified by $^{13}C$ SSNMR spectroscopy. Regardless of the precursors and/or monomers used to form the polymeric composition, it is preferred that at least 5.0% of the carbon atoms of the polymeric composition are vinyl carbon atoms, preferably at least 5.5%, at least 6.0%, at least 6.5%, at least 7.0% and even more preferably, at least 7.5% of the carbon atoms are vinyl carbon atoms. Such a concentration of vinyl groups provides a desirably strong colour change from white to yellow which as the number of vinyl carbon atoms is decreased below about 5.0%, the colour change and adsorptive capacity for $NO_2$ is progressively weaker.

Where the polymeric composition comprises a polymer or copolymer of divinylbenzene, the inventors have found that the free vinyl groups give rise to a peak in the $^{13}C$ SSNMR spectrum at about 112 ppm (corresponding to the unsubstituted carbon of the vinyl group, i.e. —CH=$CH_2$). In any event, the peaks resulting from a vinyl group may be readily identified by comparison of the $^{13}C$ SSNMR spectrum with that of the polymer resulting from reaction with bromine. Bromine ($Br_2$) reacts with free vinyl groups and the disappearance of the vinyl carbon peaks from the aromatic region of the $^{13}C$ SSNMR spectrum. The relative intensity of the vinyl carbon peak may then be used to quantify the total vinyl content of the polymeric composition (doubling the intensity value to account for the two carbons atoms in the vinyl group). The inventors have found that PAD1200 comprises about 3.8% unsubstituted vinyl carbon atoms which correlates to about 7.6% vinyl carbon atoms in the polymeric composition relative to the total number of carbon atoms in the polymeric composition. The inventors have found that Porapak® Q is a copolymer of a greater quantity of ethylstyrene relative to PAD1200 as evidenced by the larger peaks in the aliphatic region of the spectrum (about 15 ppm and 29 ppm). Porapak® Q gives rise to an unsubstituted vinyl carbon peak at about 112 ppm of about 3.2% intensity (correlating to a vinyl carbon content of about 6.4%).

$^{13}C$ SSNMR spectra may be acquired at a static field strength of 14.1 T ($v_0(^1H)$=600 MHz) on a Bruker Avance Neo console using Topspin 4.0 software. For $^{13}C$, the probe is tuned to 150.94 MHz and referenced to alanine $CH_3$ at 20.5 ppm. Powdered samples may be packed into zirconia MAS rotors with Kel-F caps with before and after weighings providing the sample mass. The sample mass may be from about 30 mg to about 60 mg The rotors may be spun using room temperature purified compressed air. The number of scans may be 1024 with D1 set to 30.0 s. Such parameters for $^{13}C$ SSNMR spectroscopy are typical in the art.

As will be appreciated, divinylbenzene which has the molecular formula $C_{10}H_{10}$ comprises four vinyl carbon atoms, two of which will form part of a polymer backbone in order to be incorporated into the final polymer. Therefore the maximum free vinyl content of pure divinylbenzene wherein only one vinyl group is polymerised is 20.0%. Accordingly, a polymer or copolymer of divinylbenzene comprising at least 7.0% vinyl carbon atoms results from at least 35% of the second vinyl groups remaining unreacted during the polymerisation. During polymerisation, as the level of cross linking increases due to the polymerisation of two vinyl groups of the same monomer occur, conformational restriction prevents further polymerisation of the second vinyl group of neighbouring monomer units leaving the vinyl group free in the resulting polymer. Accordingly, as described herein, the polymeric composition preferably comprises a copolymer formed from least 60 wt %, at least 70 wt %, at least 80 wt %, at least 85 wt %, at least 90 wt % of a monomer having at least two vinyl groups, most preferably divinylbenzene.

According to a further aspect, there is provided an air-treatment system comprising the single-use filter as described herein. Preferably, the air-treatment system is an automobile air-conditioning system. This is particularly useful since the filter is used in a system which encounters high levels of $NO_2$, here the system is routinely checked and replaced over its useful lifetime.

Once the filter component is spent as determined by the user observing that the colour of the polymeric composition has changed to yellow, the filter component may be replaced. Alternatively, an optical sensor may be configured to alert the user of the colour change. In such an embodiment, a warning light in the control panel of the dashboard of an automobile may be used to alert the user of the colour change of the filter and therefore that the filter is spent and needs to be replaced. Alternatively, in embodiments where the polymer is in the form of the HEPA filter, the filter may just be replaced as part of a routine service of the cars air-conditioning system.

According to a further aspect, there is also provided a method of treating air to remove $NO_2$, the method comprising passing $NO_2$-containing air through the single-use filter as described herein.

In yet a further aspect, there is provided a use of a polymer or copolymer of divinylbenzene for forming an air-filtration medium, wherein at least 7.0% of the carbon atoms of the polymer or copolymer of divinylbenzene are vinyl carbon atoms as determined by $^{13}C$ SSNMR. Whilst commercial polymers and copolymers of divinylbenzene are known, these are sold for use in applications such as the purification of biological materials such as small peptides and proteins, for the treatment of waste water, the decolourisation of chemicals, sugar solutions and/or stevia or in chromatography columns. The present inventors have identified that such polymers and copolymers are particularly suitable for forming air-filtration media suitable for the removal of $NO_2$ from air.

FIGURES

The present invention will now be described further with reference to the following non-limiting Figures, in which.

Figure 1:
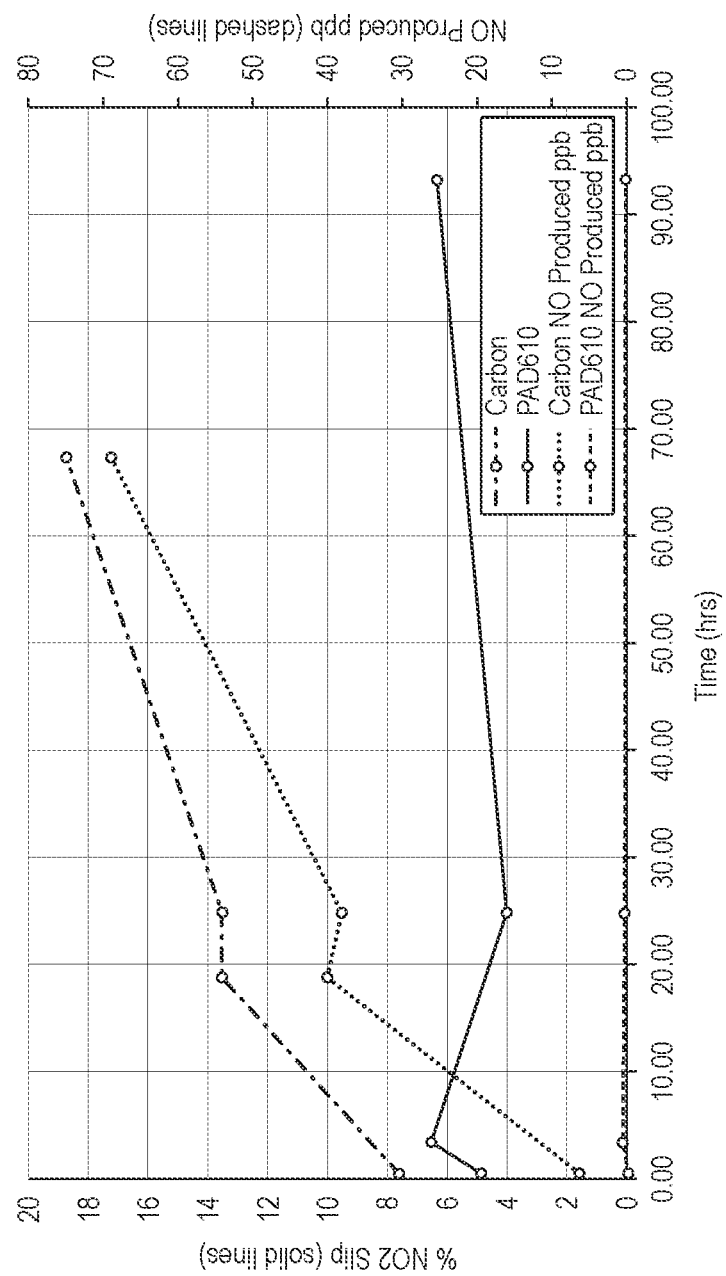
FIG. 1 is a plot of $NO_2$ slip and NO production as a function of time comparing a commercially available activated carbon with the polymer PAD610.

FIG. 1 is a comparison between a polymeric composition as described herein suitable for use in a single-use filter component and a commercially available activated carbon composition for use in a domestic air-purifier. FIG. 1 illustrates the results obtained when passing air with about 40% relative humidity and 400 ppb $NO_2$ through the test sample at room temperature (22° C.). FIG. 1 illustrates the rapid increase in $NO_2$ slip from activated carbon whereas the polymer PAD610 (a polymethacrylic cross linked with DVB and having a plurality of free vinyl groups) maintains a low level of $NO_2$ slip at over 90 hours. Advantageously, the polymeric composition does not lead to any appreciable level of NO production whereas the NO production closely follows the amount of $NO_2$ slip in activated carbon and rapidly rises to over 40 ppb.

Figure 2:
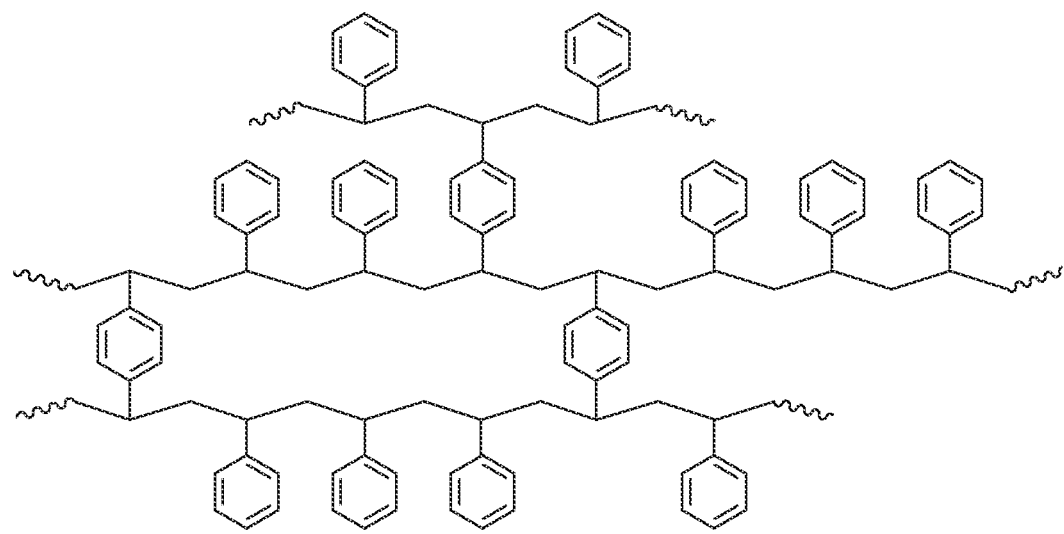
FIG. 2 represents the structure of a styrene-divinylbenzene copolymer without free vinyl groups.
Figure 3:
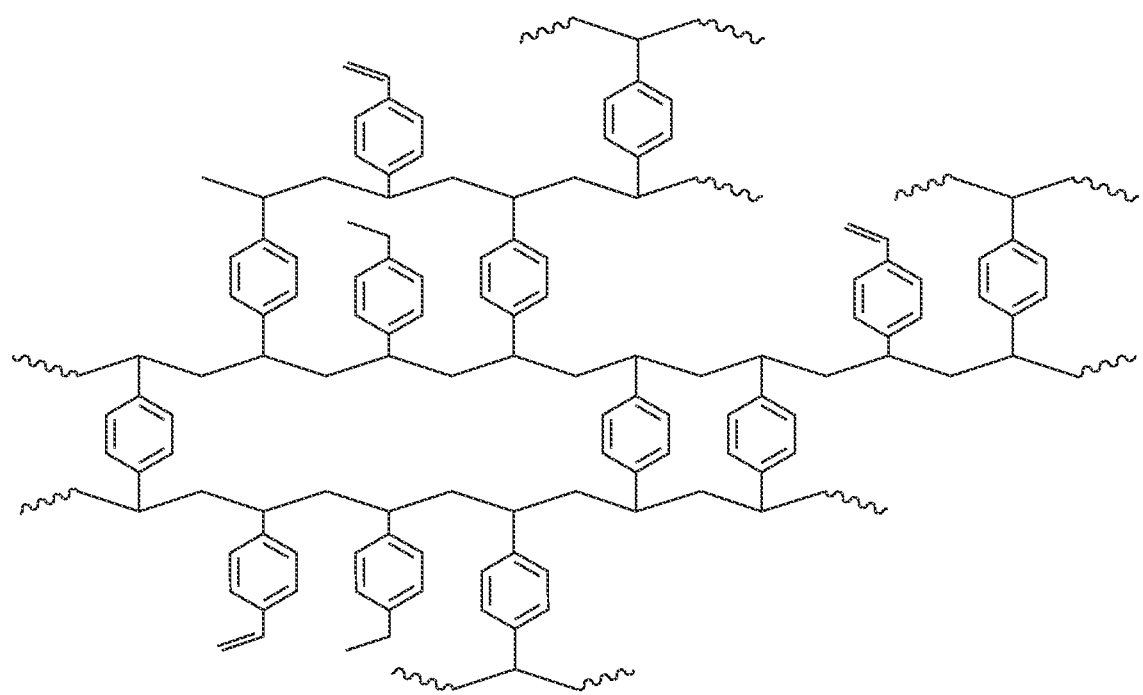
FIG. 3 represents the structure of an ethylstyrene-divinylbenzene copolymer having a plurality of free vinyl groups.

FIG. 2 represents the structure of a styrene-divinylbenzene copolymer without free vinyl groups. The divinylbenzene serves to cross link the polymer backbone of the polymerised styrene. On the other hand, FIG. 3 represents the structure of a copolymer of ethylstyrene and divinylbenzene such as that which may be obtained through polymerisation of commercially available divinylbenzene having at least 80 wt % purity, the remainder being substantially ethylstyrene. Whilst the structure illustrated in FIG. 3 comprises para substituted benzene rings, it will be appreciated that a copolymer may comprise a mixture of meta and para substitution. The copolymer illustrated in FIG. 3 which can be obtained by the polymerisation of commercially available divinylbenzene demonstrated significantly more crosslinking that the comparative copolymer of FIG. 2. The increased crosslinking during polymerisation results in a portion of the vinyl groups remaining unpolymerised and free in the resulting polymer.

As used herein, the singular form of "a", "an" and "the" include plural references unless the context clearly dictates otherwise. The use of the term "comprising" is intended to be interpreted as including such features but not excluding other features and is also intended to include the option of the features necessarily being limited to those described. In other words, the term also includes the limitations of "consisting essentially of" (intended to mean that specific further components can be present provided they do not materially affect the essential characteristic of the described feature) and "consisting of" (intended to mean that no other feature may be included such that if the components were expressed as percentages by their proportions, these would add up to 100%, whilst accounting for any unavoidable impurities), unless the context clearly dictates otherwise.

The foregoing detailed description has been provided by way of explanation and illustration, and is not intended to limit the scope of the appended claims. Many variations of the presently preferred embodiments illustrated herein will be apparent to one of ordinary skill in the art, and remain within the scope of the appended claims and their equivalents.

The invention claimed is:

1. A single-use filter component for removing $NO_2$ in an air-treatment system, the component comprising a polymeric composition as an air-filtration medium, the polymeric composition comprising a polymer or copolymer of divinylbenzene, wherein the polymeric composition comprises a plurality of free vinyl groups, wherein at least 7.0% of the carbon atoms of the polymeric composition are vinyl carbon atoms as determined by $^{13}C$ SSNMR, and wherein the component permits inspection of the air-filtration medium by an end-user to determine when the filter is spent based on a colour change of the polymeric composition from white to yellow, wherein the colour change from white to yellow arises entirely from chemisorption of $NO_2$ to the polymer composition as a result of a reaction between the plurality of the free vinyl groups with the $NO_2$.

2. The single-use filter component according to claim 1, wherein the component comprises at least an optically transparent portion to permit inspection of the air-filtration medium held within the component.

3. The single-use filter component according to claim 1, wherein the air-filtration medium is provided in the form of a plurality of beads held within the component.

4. The single-use filter component according to claim 1, wherein the air-filtration medium is provided in the form of a woven or non-woven fabric.

5. The single-use filter component according to claim 4, wherein the air-filtration medium is provided in the form of a HEPA filter.

6. The single-use filter component according to claim 1, wherein the air-filtration medium has a surface area of at least 600 $m^2/g$.

7. The single-use filter component according to claim 1, further comprising a yellow marker for permitting the end-user to make a comparison with the air-filtration media and thereby determine when the filter is spent.

8. The single-use filter component according to claim 1, wherein the polymeric composition is the product of polymerisation of a polymerisable composition comprising at least 80 wt % divinylbenzene.

9. The single-use filter component according to claim 1, wherein the component further comprises activated carbon downstream of the polymeric composition.

10. An air-treatment system comprising the single-use filter of claim 1, wherein the air-treatment system is an automobile air-conditioning system.

11. A method of treating air to remove $NO_2$, the method comprising:

passing $NO_2$-containing air through the single-use filter according to claim 1.

* * * * *